A. SABROE.
MILKING DEVICE.
APPLICATION FILED MAY 11, 1909.
973,704.
Patented Oct. 25, 1910.
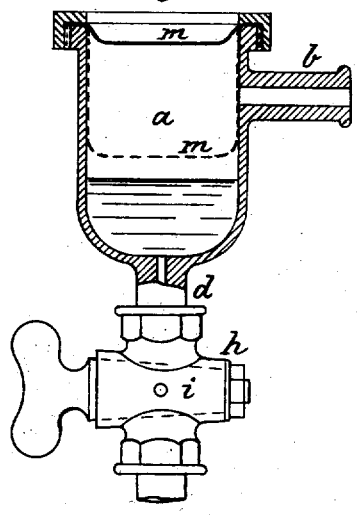
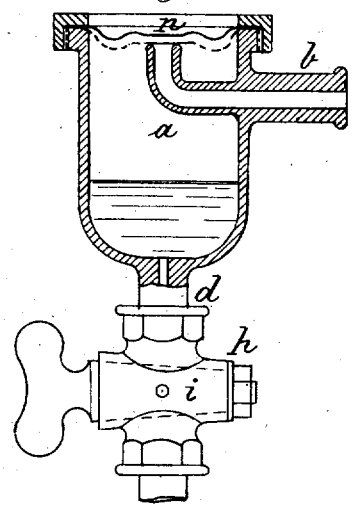
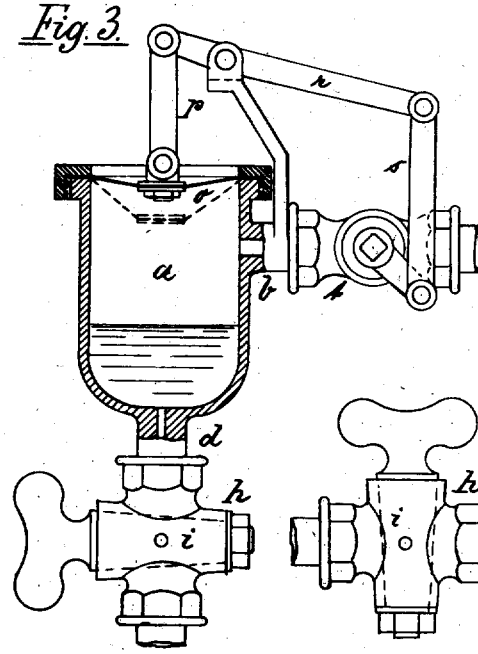
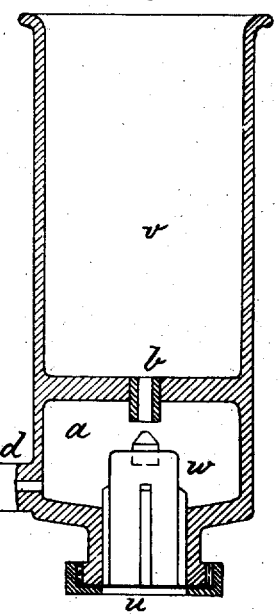
Witnesses
Hugo Hau
F. Dittmar
Inventor
Axel Sabroe
by G. Dittmar
Attorney

UNITED STATES PATENT OFFICE.

AXEL SABROE, OF HADERSLEBEN, GERMANY.

MILKING DEVICE.

973,704.  Specification of Letters Patent.  Patented Oct. 25, 1910.

Application filed May 11, 1909. Serial No. 495,252.

*To all whom it may concern:*

Be it known that I, AXEL SABROE, a subject of the Emperor of Germany, residing at Hadersleben, Schleswig-Holstein, Germany, have invented certain new and useful Improvements in Milking Devices, of which the following is an exact description.

In milking machines acting pneumatically it is of the greatest importance, that the asperation in the conduit stops as soon as the milk is exhausted in the teats or bags. In the known constructions of milking machines this is effected either by closing the conduit by means of a float or by an elastic magnetic closing device, actuated by the flow of the milk. There are also milking machines in which between the conduit for the milk and the pneumatic pipe a space is interposed, in which air is admitted as soon as the flow of the milk ceases and the pressure decreases whereupon a closing member is actuated by the atmospheric pressure. In this case nevertheless a slight suction remains because the connection of the conduit is not positively intercepted.

The present invention comprises means to close the conduit for the milk immediately by a member, moved by atmospheric pressure, when the flow of the milk ceases, and this is effected by a member, which, inclosing the space between the conduit for the milk and the pneumatic pipe, closes also the conduit for the milk. While the milk is flowing, the pressure in this space is somewhat lower under the asperating action than the exterior atmospheric pressure on the outside of said member. Under the difference of said pressures the member yields without closing the conduit of the milk. But when the flow of the milk ceases, the pressure in said space goes down to a minimum and the member is pressed inwardly by the atmospheric pressure, so that the conduit for the milk is closed.

At the beginning of the milking and up to the time the milk commences to flow, the membrane must be drawn outwardly by some means in order to counteract the atmospheric pressure. Said member can be shaped differently for instance it can be an elastic body, a membrane, a piston or the like. In the drawing it is shown in four different forms—

Figure 1 showing the application of a rubber plate, Fig. 2 being a metallic membrane. Fig. 3 illustrates means by closing off the milk conduit a valve or spigot actuated by means of an elastic plate. Fig. 4 illustrates the application of a membrane in a device without the conduit for the milk, the latter forming in itself the milk-bucket.

A small space $a$ of any shape is connected to the conduit $b$ for the milk and to the pneumatic pipe $d$ leading in the ordinary way to a collector. The opening of the conduit $b$ is larger than the opening of the pneumatic pipe $d$. Thus during the flow of the milk always a certain quantity of milk will remain in the space $a$, which acts as a regulator and produces an even flow of the milk from the conduit. As soon as the flow stops the conduit is closed immediately by atmospheric pressure, acting upon the closing member. When then the conduit is closed by a spigot $h$ the conduit for the milk is ready for further use. In order to have in the space $a$ a relieve of pressure, when the pneumatic pipe is closed, the plug of the spigot $h$ is provided with a supplementary bore $i$, so that air can enter the space $a$ when the spigot is closed.

According to Fig. 1 the space $a$ is closed by a rubber plate $m$ and the latter is pressed by the atmosphere into the space, thereby closing at the same time the conduit of the milk.

In Fig. 2 the rubber plate is substituted by a metallic membrane $n$, which is pressed by the outer atmospheric pressure against the open end of the conduit of the milk.

Fig. 3 shows a device comprising an elastic plate $o$ to which by means of a lock $p$ is connected to a lever $r$, actuating a spigot by means of a rod $t$.

Fig. 4 shows the space $a$ closed by means of a membrane $u$, which closes at the same time the milk conduit, forming at the same time the milk collector or bucket $v$. $w$ is a weight in the center of the membrane in serving to partly counterbalance it.

Having now described my invention, what I claim is:

1. In a device for the purpose described, a receptacle, a milk conduit connected therewith near the upper end thereof, a pneumatic pipe connected therewith near the bottom end of less area than said conduit, and an elastic member at the top of said receptacle serving as a closure therefor and also for closing said conduit.

2. In a device for the purpose described, a receptacle, a milk conduit connected therewith near the upper end, a pneumatic tube connected therewith near the bottom and of less area than said conduit, an elastic member forming the closure for the top of said receptacle and for closing said conduit, and means for closing said pneumatic pipe, said means being provided with an air inlet opening.

3. In a device for the purpose described, a receptacle having a space, a pneumatic tube connected therewith near the bottom, a milk conduit connected therewith near the top, an elastic member forming a closure for the top of said receptacle and adapted to yield into said space under atmospheric pressure, a spigot in said conduit, and connections between said spigot and elastic member whereby they are actuated simultaneously.

In testimony whereof I affix my signature.

AXEL SABROE.

In the presence of—
JULIUS RÖPKE,
HUGO LIEBELT.